US009312948B2

United States Patent
Huang (10) Patent No.: US 9,312,948 B2
(45) Date of Patent: Apr. 12, 2016

(54) METHOD AND APPARATUS FOR ENABLING WIRELESS DOCKEES TO FIND AND DOCK WITH A WIRELESS DOCKING HOST BEING USED BY ANOTHER DOCKEE

(71) Applicant: QUALCOMM Incorporated, San Diego, CA (US)

(72) Inventor: Xiaolong Huang, San Diego, CA (US)

(*) Notice: Subject to any disclaimer, the term of this patent is extended or adjusted under 35 U.S.C. 154(b) by 116 days.

(21) Appl. No.: 13/757,849

(22) Filed: Feb. 3, 2013

(65) Prior Publication Data

US 2014/0010220 A1 Jan. 9, 2014

Related U.S. Application Data

(60) Provisional application No. 61/669,652, filed on Jul. 9, 2012.

(51) Int. Cl.
| | |
|---|---|
| *H04B 7/24* | (2006.01) |
| *H04W 8/00* | (2009.01) |
| *H04W 48/08* | (2009.01) |
| *H04L 29/08* | (2006.01) |
| *H04W 8/22* | (2009.01) |

(52) U.S. Cl.
CPC *H04B 7/24* (2013.01); *H04L 67/16* (2013.01); *H04W 8/005* (2013.01); *H04W 8/22* (2013.01); *H04W 48/08* (2013.01)

(58) Field of Classification Search
CPC ........ H04B 7/24; H04W 8/005; H04W 48/08; H04W 84/18; H04W 8/22; H04W 76/043; H04W 76/023; H04W 88/04; H04W 4/008; H04W 4/08; H04L 67/16; H04L 69/24
See application file for complete search history.

(56) References Cited

U.S. PATENT DOCUMENTS

| | | | |
|---|---|---|---|
| 2007/0141988 A1 | 6/2007 | Kuehnel et al. | |
| 2008/0052340 A1 | 2/2008 | Hallmark | |
| 2008/0062945 A1 | 3/2008 | Ahuja et al. | |
| 2008/0195788 A1 | 8/2008 | Tamir et al. | |
| 2010/0010899 A1 | 1/2010 | Lambert et al. | |
| 2010/0322213 A1 | 12/2010 | Liu et al. | |
| 2011/0034127 A1 | 2/2011 | Wentink et al. | |
| 2011/0082939 A1* | 4/2011 | Montemurro et al. | 709/227 |
| 2011/0082940 A1* | 4/2011 | Montemurro et al. | 709/227 |
| 2011/0106837 A1 | 5/2011 | Walton et al. | |

(Continued)

OTHER PUBLICATIONS

Wireless Docking Consortium, Wireless Docking Consortium Technical Committee, Wireless Docking Task Group, "Wireless Docking Technical Specification, Version 0.11," May 15, 2012.

(Continued)

*Primary Examiner* — Yee Lam
(74) *Attorney, Agent, or Firm* — Brian Lambert (57) ABSTRACT

Various aspects of the present disclosure enable a dockee that establishes docking with a wireless docking host that manages a docking environment to gather information about the wireless docking host, including docking host information and one or more wireless peripheral devices managed by the wireless docking host. The dockee may then store the results of the functionality information. In one aspect of the disclosed approach, the dockee may advertise the functionality information of the wireless docking host to other dockees. Other aspects, embodiments, and features are also claimed and described.

36 Claims, 4 Drawing Sheets

(56) References Cited

U.S. PATENT DOCUMENTS

| | | |
|---|---|---|
| 2011/0153773 A1 | 6/2011 | Vandwalle et al. |
| 2011/0188391 A1* | 8/2011 | Sella et al. .................... 370/252 |
| 2012/0099566 A1* | 4/2012 | Laine et al. ................... 370/338 |
| 2012/0106475 A1 | 5/2012 | Jung |
| 2012/0195227 A1* | 8/2012 | Vedantham et al. .......... 370/253 |
| 2012/0265913 A1* | 10/2012 | Suumaki et al. .............. 710/303 |
| 2013/0064175 A1* | 3/2013 | Pandey et al. ................. 370/328 |
| 2013/0322297 A1* | 12/2013 | Dominguez ................ 370/255 |

OTHER PUBLICATIONS

Wright, "Wi-Fi Direct adds Peer-to-Peer Capabilities to Ubiquitous Wireless Network Technology", Retrieved from http://www.digikey.com/us/en/techzone/wireless/resources/articles/Wi-Fi-Direct-adds-Peer-to-Peer-Capabilities.html on Sep. 23, 2012.
International Search Report and Written Opinion—PCT/US2013/049673—ISA/EPO—Dec. 2, 2013.

* cited by examiner

METHOD AND APPARATUS FOR ENABLING WIRELESS DOCKEES TO FIND AND DOCK WITH A WIRELESS DOCKING HOST BEING USED BY ANOTHER DOCKEE

CROSS-REFERENCE TO RELATED APPLICATIONS

This application claims priority to and the benefit of provisional patent application No. 61/669,652, titled "Method and Apparatus for Enabling Wireless Dockees to Find and Dock with a Wireless Docking Host Being Used by Another Dockee" and filed in the United States Patent and Trademark Office on Jul. 9, 2012, the entire contents of which are incorporated herein by reference.

TECHNICAL FIELD

Aspects of the present disclosure relate generally to wireless docking systems, and more particularly, to a method and apparatus for enabling wireless dockees to find and dock with a wireless docking host being used by another dockee.

BACKGROUND

Wireless communication networks are widely deployed to provide various communication services such as telephony, video, data, messaging, broadcasts, and so on. Such networks, which are usually multiple access networks, support communications for multiple users by sharing the available network resources.

Recent interest has been directed toward WLAN connectivity, where a dockee, e.g., a mobile device such as a cellular telephone, can utilize a WLAN interface (e.g., an IEEE 802.11 "Wi-Fi" interface) to establish wireless communication links with one or more peripheral devices. Here, peripheral devices can be any of numerous types, such as a mouse, keyboard, display, printer, camera, speakers, mass storage devices, media servers, sensors, and many others.

As the demand for mobile broadband access continues to increase, research and development continue to advance wireless technologies not only to meet the growing demand for mobile broadband access, but to advance and enhance the user experience with mobile communications.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects of the present disclosure enable a dockee that establishes docking with a wireless docking host that manages a docking environment to gather information about the wireless docking host, including docking host information and one or more wireless peripheral devices managed by the wireless docking host. The dockee may then store the results of the functionality information. In one aspect of the disclosed approach, the dockee may advertise the functionality information of the wireless docking host to other dockees.

In one aspect, the disclosure provides a method for sharing information about a wireless docking host to which a first wireless dockee is docked with a second wireless dockee, the method including the steps of compiling docking host information regarding the wireless docking host, and advertising the docking host information regarding the wireless docking host.

In another aspect, the disclosure provides a method for using shared information about a wireless docking host to which a first wireless dockee is docked by a second wireless dockee, the method including the steps of receiving docking host information regarding the wireless docking host by the second wireless dockee as advertised by the first wireless dockee, initiating a device discoverability request transaction with the first wireless dockee based on the docking host information, and connecting to the wireless docking host.

In another aspect, the disclosure provides a wireless dockee configured for sharing information about a wireless docking host to which the wireless dockee is docked with a second wireless dockee, the wireless dockee including at least one processor, a memory communicatively coupled to the at least one processor, and a transceiver communicatively coupled to the at least one processor, wherein the at least one processor is configured to compile docking host information regarding the wireless docking host, and to advertise the docking host information regarding the wireless docking host.

In another aspect, the disclosure provides a wireless dockee configured for using shared information about a wireless docking host to which the wireless dockee is docked by a second wireless dockee, the wireless dockee including at least one processor, a memory communicatively coupled to the at least one processor, and a transceiver communicatively coupled to the at least one processor, wherein the at least one processor is configured to receive docking host information regarding the wireless docking host by the second wireless dockee as advertised by the wireless dockee, to initiate a device discoverability request transaction with the wireless dockee based on the docking host information, and to connect to the wireless docking host.

In another aspect, the disclosure provides a computer-readable storage medium operational for sharing information about a wireless docking host to which a first wireless dockee is docked with a second wireless dockee, the computer-readable storage medium including instructions for causing a computer to compile docking host information regarding the wireless docking host, and to advertise the docking host information regarding the wireless docking host.

In another aspect, the disclosure provides a computer-readable storage medium operational for using shared information about a wireless docking host to which a first wireless dockee is docked by a second wireless dockee, the computer-readable storage medium including instructions for causing a computer to receive docking host information regarding the wireless docking host by the second wireless dockee as advertised by the first wireless dockee, to initiate a device discoverability request transaction with the first wireless dockee based on the docking host information, and to connect to the wireless docking host.

In another aspect, the disclosure provides a wireless dockee configured for sharing information about a wireless docking host to which the wireless dockee is docked with a second wireless dockee, the wireless dockee including means for compiling docking host information regarding the wireless docking host, and means for advertising the docking host information regarding the wireless docking host.

In another aspect, the disclosure provides a wireless dockee configured for using shared information about a wireless docking host to which the wireless dockee is docked by a second wireless dockee, the wireless dockee including means for receiving docking host information regarding the wireless docking host by the second wireless dockee as advertised by the wireless dockee, means for initiating a device discoverability request transaction with the wireless dockee based on the docking host information, and means for connecting to the wireless docking host.

These and other aspects of the invention will become more fully understood upon a review of the detailed description, which follows.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

A wireless docking system may provide seamless connectivity, enabling a portable device such as a mobile phone, PDA, tablet computer, etc., to connect with a group of peripheral devices without needing wires or a docking connector, a PIN code or elaborate pairing process per peripheral, etc. The peripherals may act as a group, which needs only to be set up once. Many different types of peripherals may be supported, including bridging of legacy peripherals. Ideally, the best link, protocol, and QoS would be automatically set up for each type of peripheral connection, such as 2.4, 5, or 60 GHz, etc. The best connection may be selected depending on the application (e.g., for a productivity application, for watching videos, or for playing games, etc.), and the environment (e.g., home, enterprise, an Internet café, etc.). Here, existing application sessions/connections may be left intact.

Figure 1:
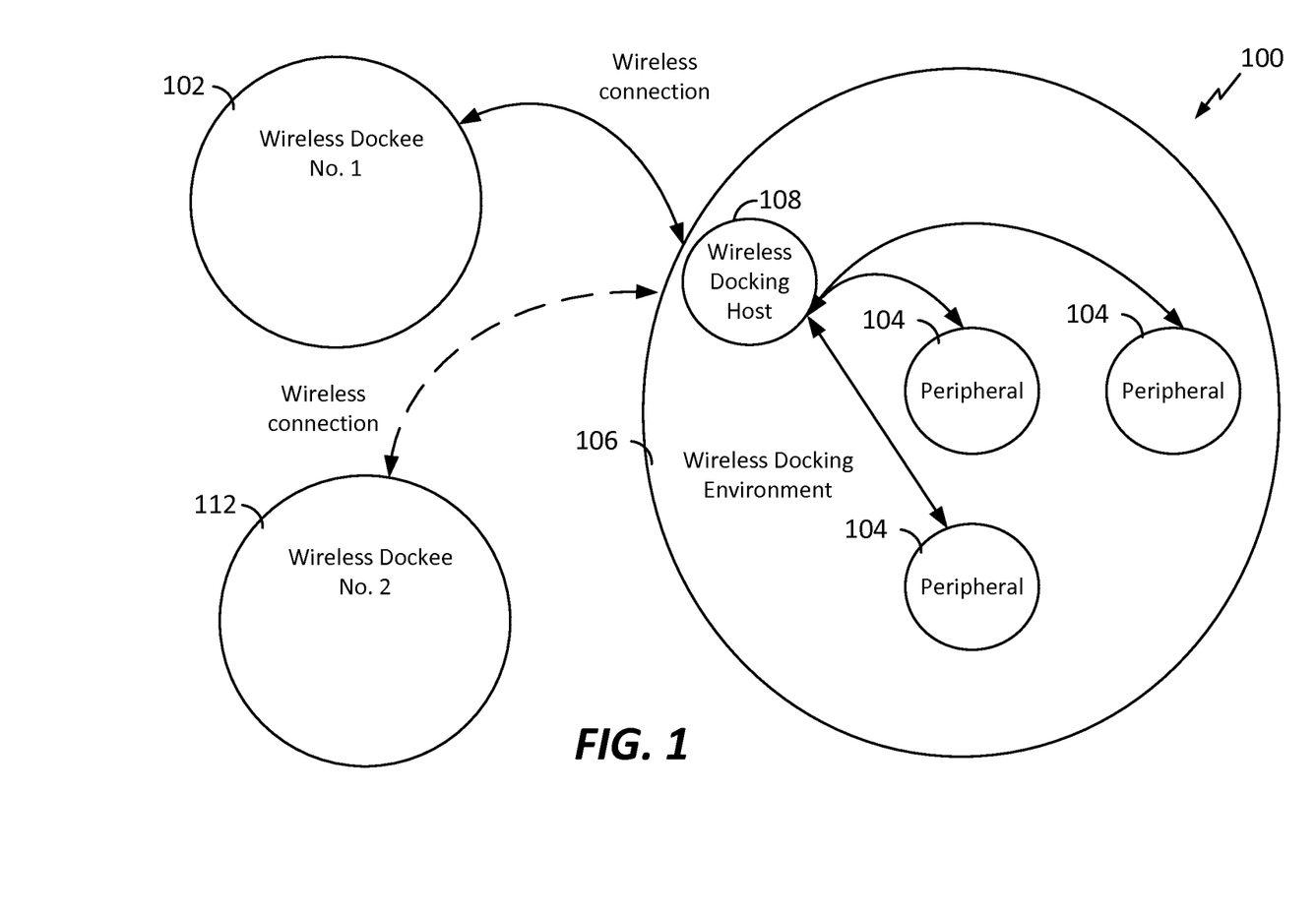
FIG. 1 is a simplified schematic diagram of a conventional wireless docking system utilizing a docking environment.

A wireless docking system may provide a wireless connection between a wireless dockee and a wireless docking environment. FIG. 1 is a simplified diagram that illustrates a wireless docking system 100 including a dockee 102 in wireless communication with a plurality of peripherals 104 by way of a wireless docking host 108, as a part of a wireless docking environment 106. A second dockee 112 is also included in the wireless docking system 100 and may be in wireless communication with the plurality of peripherals 104 by way of the wireless docking host 108, as further disclosed herein.

The dockee 102 may be any suitable device capable of wirelessly connecting to the wireless docking environment 106 utilizing any suitable communication protocol, which may include but is not limited to IEEE 802.11 "Wi-Fi." By connecting to the wireless docking environment 106, the dockee 102 may be capable of connecting directly or indirectly to each of the peripherals 104 that are part of the wireless docking environment 106.

The wireless docking environment 106 is a group of one or more physical devices, including one or more wireless docking hosts 108 and one or more peripherals 104. A wireless docking environment 106 can take any suitable configuration or topology, for example, including nothing more than a wireless docking host 108, or additionally including one or more peripherals 104.

The peripherals 104 may represent peripheral functions, e.g., logical functions such as physical display output, keyboard input, etc. In general, a peripheral function may be any I/O function implemented in a wireless docking host 108 that can be made available to a wireless dockee 102 through any of various suitable wireless interfaces; any I/O function in an external peripheral device that can be made available to the wireless dockee 102 through the wireless docking host 108, where the external peripheral device may be directly connected to the wireless docking host 108; or any I/O function in an external peripheral device that can be connected directly to the wireless dockee 102, and whose connection to the wireless dockee 102 is set up utilizing information provided by the wireless docking host 108.

The peripherals 104 may in some examples be embodied as physical devices having wired and/or wireless interfaces for communicating with the wireless dockee 102 through the wireless docking host 108. Some nonlimiting examples of peripherals might include LCD monitors, USB speakers, USB keyboards, a mouse, a printer, a scanner, a mass storage device, etc. Some devices that may be included in the examples for the peripherals 104 include a well-known class of devices referred to as a human interface device (HID) class of devices, which is a type of computer device that interacts directly with humans. The interaction may include, and most often takes the form of, input from and output to humans. The term "HID" typically refers to devices implemented in conformity to the USB-HID specification as promulgated by the USB Implementers Forum, Inc.

The wireless docking host 108 may be any suitable device capable of connecting to the wireless dockee 102 and one or more peripherals 104. For example, the wireless docking host 108 may make available to the wireless dockee 102 peripheral functions on external peripherals 104 that are connected to the docking host 108 directly, as well as peripheral functions the wireless docking host 108 itself may implement (e.g., a display). As noted in the discussion related to the plurality of peripherals 104, the peripherals may be of the HID class of devices such as the USB-HID class of devices. Generally, there are 2 entities in the HID protocol—a "host" and a "device". The device, which may be any one of the peripherals 104 in various aspects of the approaches described herein, is the entity that directly interacts with a human, such as a keyboard or mouse. The host communicates with the device and receives input data from the device on actions performed by the human. Output data flows from the host to the device and then to the human. The most common example of a host is a computer, but some cell phones and PDAs also can be hosts. In various aspects of the approach disclosed herein, because the wireless dockee 102 is in wireless communication with the plurality of peripherals 104 by way of the wireless docking host 108 as a part of a wireless docking environment 106, the wireless dockee 102 may communicate with the plurality of peripherals 104 either directly or through the wireless docking host 108.

Figure 2:
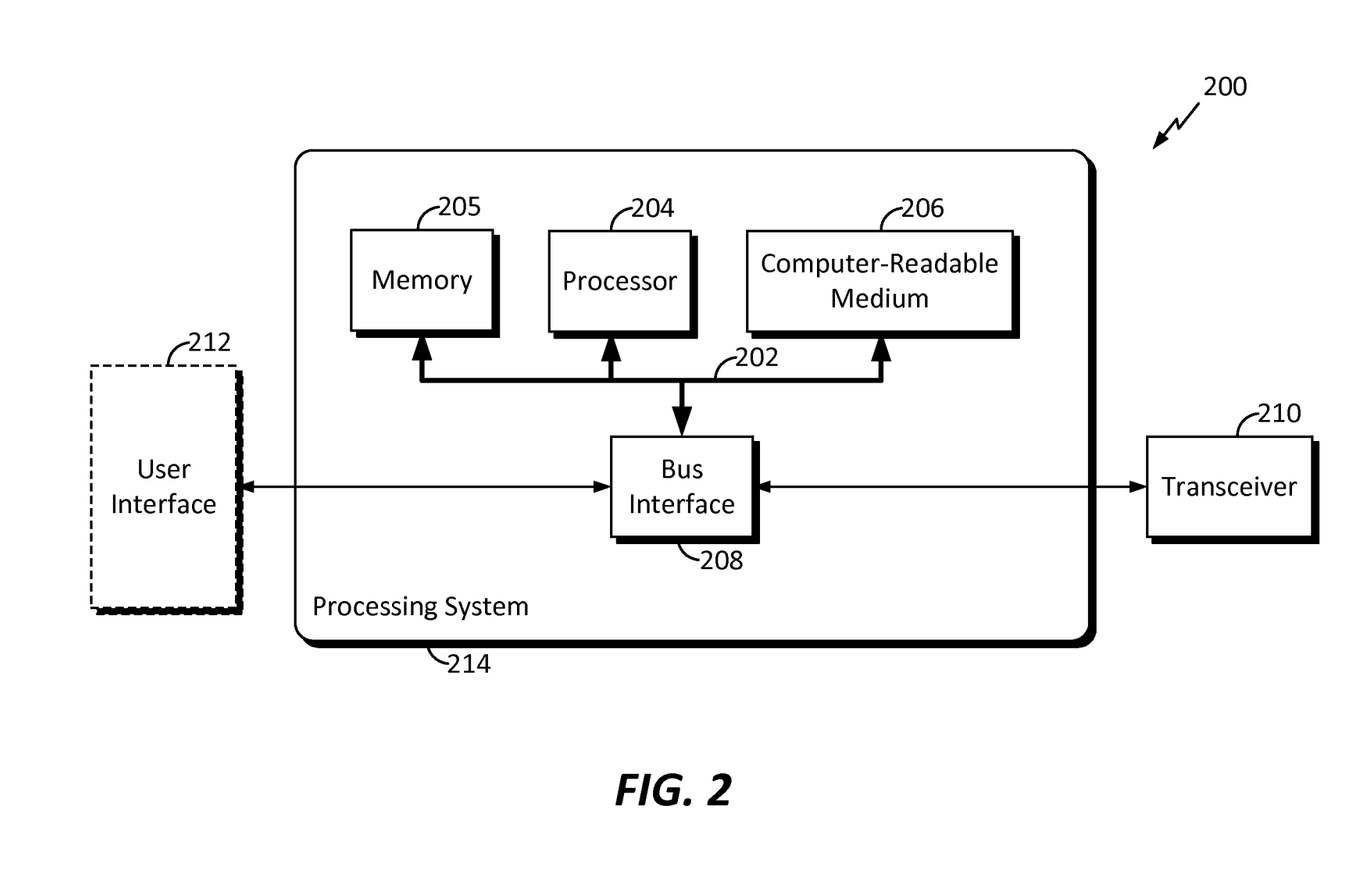
FIG. 2 is a block diagram illustrating an example of a hardware implementation for an apparatus employing a processing system.

FIG. 2 is a conceptual diagram illustrating an example of a hardware implementation for an apparatus 200 employing a processing system 214. In accordance with various aspects of the present disclosure, an element, or any portion of an element, or any combination of elements may be implemented with a processing system 214 that includes one or more processors 204. For example, in various aspects, the apparatus 200 may represent any one or more of a wireless dockee, a wireless docking host, and/or a peripheral device. Examples of processors 204 that may be utilized in an apparatus 200 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

In this example, the processing system 214 may be implemented with a bus architecture, represented generally by the bus 202. The bus 202 may include any number of interconnecting buses and bridges depending on the specific application of the processing system 214 and the overall design constraints. The bus 202 links together various circuits including one or more processors (represented generally by the processor 204), a memory 205, and computer-readable media (represented generally by the computer-readable medium 206). The bus 202 may also link various other circuits such as timing sources, peripherals, voltage regulators, and power management circuits, which are well known in the art, and therefore, will not be described any further. A bus interface 208 provides an interface between the bus 202 and a transceiver 210. The transceiver 210 provides a means for communicating with various other apparatus over a transmission medium. Depending upon the nature of the apparatus, a user interface 212 (e.g., keypad, display, speaker, microphone, joystick) may also be provided.

The processor 204 is responsible for managing the bus 202 and general processing, including the execution of software stored on the computer-readable medium 206. The software, when executed by the processor 204, causes the processing system 214 to perform the various functions described infra for any particular apparatus. The computer-readable medium 206 may also be used for storing data that is manipulated by the processor 204 when executing software.

One or more processors 204 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 206. The computer-readable medium 206 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 206 may reside in the processing system 214, external to the processing system 214, or distributed across multiple entities including the processing system 214. The computer-readable medium 206 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 3:
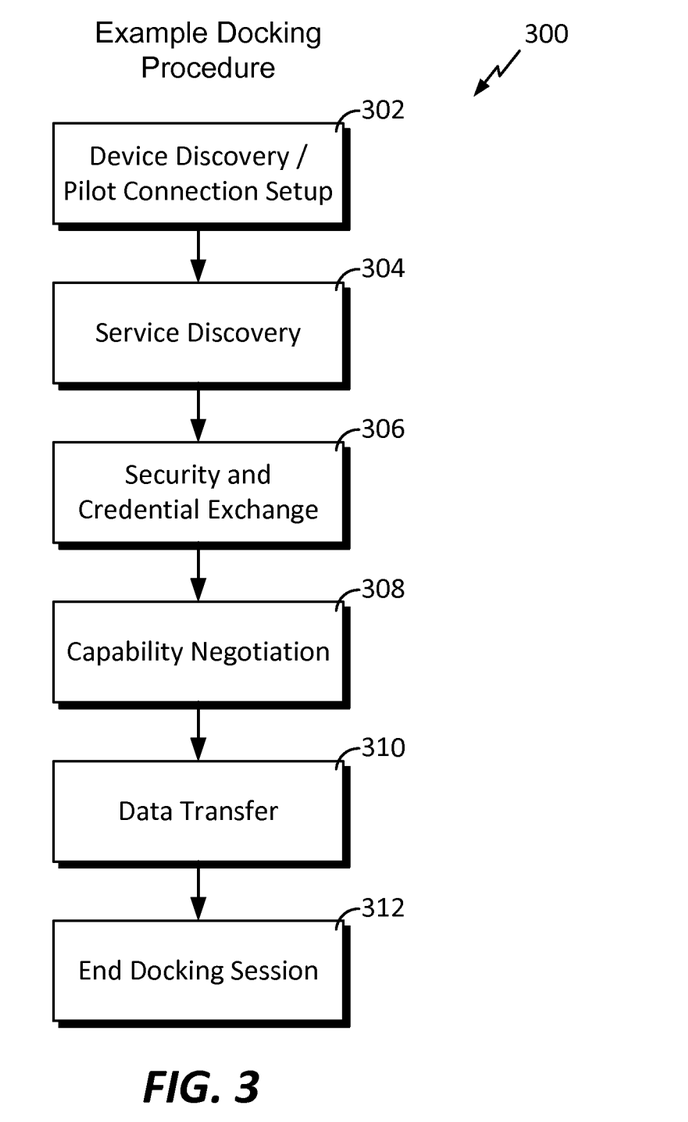
FIG. 3 is a flow chart illustrating a docking procedure according to one example.

The establishment of a docking session between the wireless dockee 102 and the wireless docking host 108 may involve a relatively large number of steps including discovery, negotiation, etc. FIG. 3 illustrates an example of a docking procedure 300 that might be utilized to establish a docking session between a wireless dockee such as the wireless dockee 102 and a wireless docking host such as the wireless docking host 108. The example call flow includes the sequential steps of device discovery at 302, service discovery at 304, security and credential exchange at 306, and capability negotiation at 308, after which the docked devices may begin to transfer data at 310 before ending the docking session at 312.

At 302, the dockee, which may be a device such as a handset or laptop, comes into the vicinity of the docking host and wirelessly connects to the docking host through a device discovery protocol. The docking host manages a group of peripherals that are attached or connected to itself, either wirelessly or wired.

At 304, the docking host advertises its managed peripherals to the dockee over the wireless link between itself and the dockee through a service discovery protocol.

At 306 and 308, the dockee then chooses the peripherals it likes to use and then establishes connections with the peripherals through the docking host or directly with the peripherals using a wireless docking protocol.

At 310, the dockee, the peripherals, and the docking host may transfer data through a data transfer protocol.

At 312, once all data transfers have been completed, the docking session may end. In addition to manually ending the docking session, the docking session may end automatically when the dockee moves out of the vicinity of the docking environment, device sleep mode, or any number of possible scenarios.

During wireless docking, a wireless dockee such as the wireless dockee 102 docks with a docking host such as the wireless docking host 108 to use the peripherals such as the wireless peripherals 104 attached to or paired with the docking host. When the docking connection between a dockee and its docking host is formed within a Wi-Fi P2P group, it may be that the dockee assumes the role of the group owner and the docking host assumes the role of a client. However, when a docking host becomes a Wi-Fi P2P client of a dockee, the docking host may not be discoverable by other dockees, which leads to the situation of other dockees such as the wireless dockee 112 not being able to dock with the docking host to use sharable peripherals managed by the docking host.

Using Wi-Fi P2P protocols, a device may communicate with a Wi-Fi P2P group owner to obtain a list of P2P clients of the Wi-Fi P2P group and then request some Wi-Fi P2P clients be made discoverable. However, in wireless docking, such a procedure may not be utilized until a dockee first knows the existence and the capability of any hidden wireless docking hosts, and understands the mapping between docking host identities and Wi-Fi P2P device IDs. Thus, in one aspect of the disclosed approach, a dockee may be allowed to find and make decisions to dock with a wireless docking host being used by another dockee.

Figure 4:
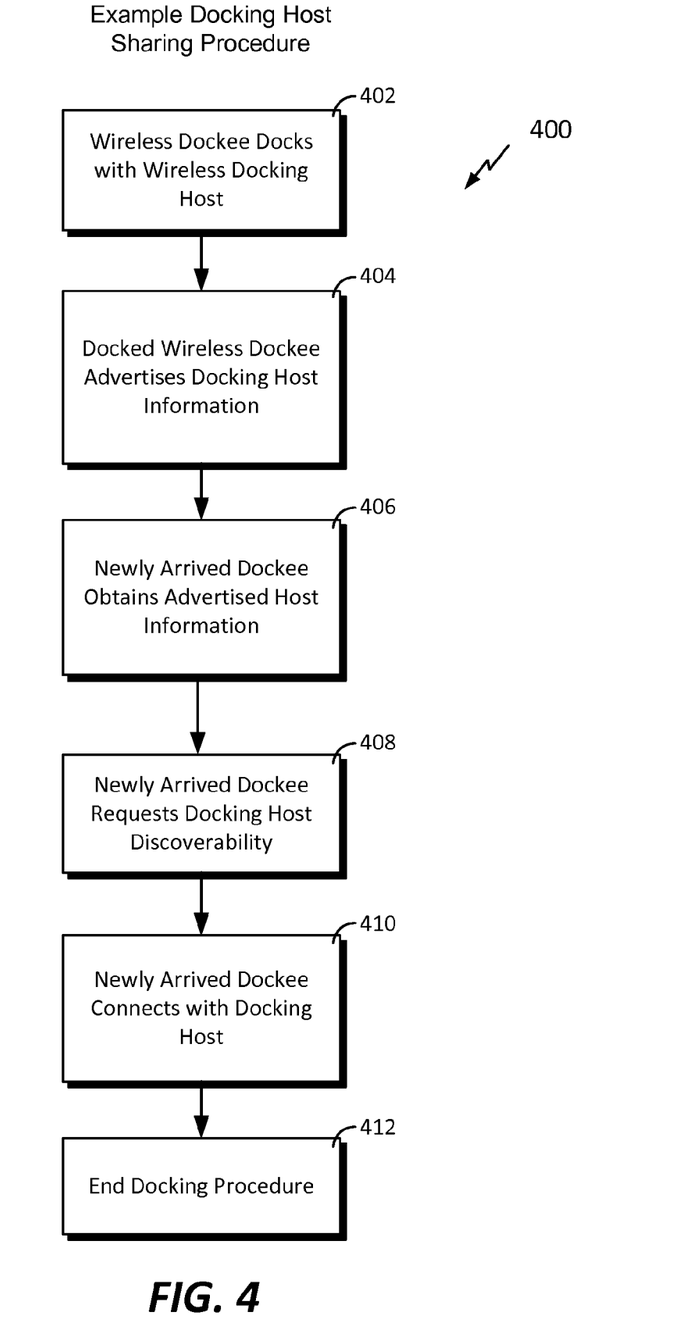
FIG. 4 is a flow chart illustrating a docking host sharing procedure by a wireless dockee for a wireless docking host configured in accordance with various aspects of the disclosed approach.

FIG. 4 illustrates a process 400 for a wireless dockee, such as the wireless dockee 102, that is docked with a wireless docking host, such as the wireless docking host 108, to share information for the docking host with a second wireless dockee, such as the wireless dockee 112. The second wireless dockee may then dock with the docking host.

At 402, the wireless dockee docks with the wireless docking host through the use of a procedure such as described in FIG. 3. In one aspect of the disclosed approach, the wireless dockee and the wireless docking host are part of a Wi-Fi P2P group and the wireless dockee may assume the role of the Wi-Fi P2P group owner. The wireless dockee will be referred to herein as the docked wireless dockee.

At 404, the docked wireless dockee may advertise docking host information, referred to as hidden docking host information. In one aspect of the disclosed approach, the hidden docking host information may include:
- the identifier at the docking protocol layer of every docking host that is a Wi-Fi P2P client of the dockee;
- the capability information of every docking host that is a Wi-Fi P2P client of the dockee; and
- the Wi-Fi P2P Device ID at the Wi-Fi P2P layer of every docking host that is a Wi-Fi P2P client of the dockee.

Further, the capability information of every docking host that is a Wi-Fi P2P client of the dockee may include:
- peripheral functions supported by the docking host;
- docking use cases that can be supported by the docking host;
- whether the docking host can be used by more than one dockee; and
- the sharable peripheral functions that are currently available at the docking host.

At 406, a newly arrived dockee such as the wireless dockee 112 may obtain the advertised hidden docking host information by the docked dockee. The information may assist a user of the newly arrived dockee to decide whether and which docking host it may prefer to use.

At 408, once a docking host is chosen, the wireless dockee may utilize a device discoverability request transaction with the docked dockee to make the hidden docking host discoverable. Thus, in one aspect of the disclosed approach, the wireless dockee 112 may request the wireless dockee 102 make the wireless docking host 108 available using a Wi-Fi P2P device discoverability request transaction.

At 410, the newly arrived dockee may subsequently connect to the wireless docking host. In one aspect of the disclosed approach, the newly arrived dockee may connect with the wireless docking host using the previously advertised and obtained docking host information.

At 412, the docking procedure 400 ends and the newly arrived dockee, which has now become a docked dockee, may continue with the normal docked operations.

Several aspects of a wireless docking system have been presented with reference to a system utilizing IEEE 802.11 "Wi-Fi" communication protocols. As those skilled in the art will readily appreciate, various aspects described throughout this disclosure may be extended to other communication systems, network architectures and communication standards. The actual telecommunication standard, network architecture, and/or communication standard employed will depend on the specific application and the overall design constraints imposed on the system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for sharing information about a wireless docking host, to which a first wireless dockee is docked, with a second wireless dockee, the method comprising:
   forming a docking connection between the first wireless dockee and the wireless docking host, wherein the first wireless dockee and the wireless docking host are part of a peer-to-peer (P2P) group and the first wireless dockee assumes a role of a group owner of the P2P group such that the wireless docking host is not directly discoverable by the second wireless dockee;
   receiving docking host information regarding the wireless docking host from the wireless docking host, the wireless docking host being configured to provide communication connectivity for the first wireless dockee and the second wireless dockee to at least one peripheral managed by the wireless docking host, and the docking host information identifying the at least one peripheral managed by the wireless docking host;
   compiling the docking host information regarding the wireless docking host; and
   advertising the docking host information regarding the wireless docking host.

2. The method of claim 1, wherein the P2P group is a Wi-Fi peer-to-peer (P2P) group and the first wireless dockee assumes a role of a Wi-Fi P2P group owner.

3. The method of claim 1, wherein the docking host information is hidden before the advertising of the docking host information by the first wireless dockee.

4. The method of claim 1, wherein the docking host information comprises at least one of:

an identifier at a docking protocol layer of every docking host that is a Wi-Fi peer-to-peer (P2P) client of the first wireless dockee;
capability information of every docking host that is a Wi-Fi P2P client of the first wireless dockee; or
a Wi-Fi P2P Device identifier (ID) at a Wi-Fi P2P layer of every docking host that is a Wi-Fi P2P client of the first wireless dockee.

5. The method of claim 4, wherein the capability information of every docking host that is the Wi-Fi P2P client of the first wireless dockee comprises at least one of:
peripheral functions supported by a docking host;
docking use cases that may be supported by the docking host;
whether the docking host may be used by more than one dockee; or
sharable peripheral functions that are currently available at the docking host.

6. A method for using shared information about a wireless docking host, to which a first wireless dockee is docked, by a second wireless dockee, the method comprising:
receiving docking host information regarding the wireless docking host by the second wireless dockee as advertised by the first wireless dockee, wherein the first wireless dockee and the wireless docking host are part of a peer-to-peer (P2P) group and the first wireless dockee assumes a role of a group owner of the P2P group such that the wireless docking host is not directly discoverable by the second wireless dockee, the wireless docking host being configured to provide communication connectivity for the first wireless dockee and the second wireless dockee to at least one peripheral managed by the wireless docking host, and the docking host information identifying the at least one peripheral managed by the wireless docking host;
initiating a device discoverability request transaction with the first wireless dockee based on the docking host information; and
connecting to the at least one peripheral managed by the wireless docking host as a result of the initiation of the device discoverability request transaction.

7. The method of claim 6, further comprising determining whether to connect to the wireless docking host before initiating the device discoverability request transaction.

8. The method of claim 7, wherein the initiating the device discoverability request transaction comprises requesting the first wireless dockee to make the wireless docking host available using a Wi-Fi peer-to-peer (P2P) device discoverability request transaction.

9. The method of claim 6, wherein the connecting to the wireless docking host comprises connecting to the wireless docking host using the docking host information.

10. A first wireless dockee configured for sharing information about a wireless docking host, to which the first wireless dockee is configured to be docked, with a second wireless dockee, the first wireless dockee comprising:
at least one processor;
a memory communicatively coupled to the at least one processor; and
a transceiver communicatively coupled to the at least one processor,
wherein the at least one processor is configured to:
form a docking connection between the first wireless dockee and the wireless docking host, wherein the first wireless dockee and the wireless docking host are part of a peer-to-peer (P2P) group and the first wireless dockee assumes a role of a group owner of the P2P group such that the wireless docking host is not directly discoverable by the second wireless dockee;
receive docking host information regarding the wireless docking host from the wireless docking host, the wireless docking host being configured to provide communication connectivity for the first wireless dockee and the second wireless dockee to at least one peripheral managed by the wireless docking host, and the docking host information identifying the at least one peripheral managed by the wireless docking host;
compile the docking host information regarding the wireless docking host; and
advertise the docking host information regarding the wireless docking host.

11. The first wireless dockee of claim 10, wherein the P2P group is a Wi-Fi peer-to-peer (P2P) group and the first wireless dockee assumes a role of a Wi-Fi P2P group owner.

12. The first wireless dockee of claim 10, wherein the docking host information is hidden before the advertising of the docking host information by the first wireless dockee.

13. The first wireless dockee of claim 10, wherein the docking host information comprises at least one of:
an identifier at a docking protocol layer of every docking host that is a Wi-Fi peer-to-peer (P2P) client of the first wireless dockee;
capability information of every docking host that is a Wi-Fi P2P client of the first wireless dockee; or
a Wi-Fi P2P Device identifier (ID) at a Wi-Fi P2P layer of every docking host that is a Wi-Fi P2P client of the first wireless dockee.

14. The first wireless dockee of claim 13, wherein the capability information of every docking host that is the Wi-Fi P2P client of the first wireless dockee comprises at least one of:
peripheral functions supported by a docking host;
docking use cases that may be supported by the docking host;
whether the docking host may be used by more than one dockee; or
sharable peripheral functions that are currently available at the docking host.

15. A first wireless dockee configured for using shared information about a wireless docking host, to which a second wireless dockee is configured to be docked, from the second wireless dockee, the first wireless dockee comprising:
at least one processor;
a memory communicatively coupled to the at least one processor; and
a transceiver communicatively coupled to the at least one processor,
wherein the at least one processor is configured to:
receive docking host information regarding the wireless docking host by the first wireless dockee as advertised by the second wireless dockee, wherein the first wireless dockee and the wireless docking host are part of a peer-to-peer (P2P) group and the first wireless dockee assumes a role of a group owner of the P2P group such that the wireless docking host is not directly discoverable by the second wireless dockee, the wireless docking host being configured to provide communication connectivity for the first wireless dockee and the second wireless dockee to at least one peripheral managed by the wireless docking host, and the docking host information identifying the at least one peripheral managed by the wireless docking host;

initiate a device discoverability request transaction with the second wireless dockee based on the docking host information; and connect to the at least one peripheral managed by the wireless docking host as a result of the initiation of the device discoverability request transaction.

16. The first wireless dockee of claim 15, wherein the at least one processor is further configured to determine whether to connect to the wireless docking host before initiating the device discoverability request transaction.

17. The first wireless dockee of claim 16, wherein the at least one processor, being configured to initiate the device discoverability request transaction, is further configured to request the second wireless dockee to make the wireless docking host available using a Wi-Fi peer-to-peer (P2P) device discoverability request transaction.

18. The first wireless dockee of claim 15, wherein the at least one processor, being configured to connect to the wireless docking host, is further configured to connect to the wireless docking host using the docking host information.

19. A non-transitory computer-readable storage medium operational for sharing information about a wireless docking host, to which a first wireless dockee is docked, with a second wireless dockee, the computer-readable storage medium comprising instructions for causing a computer to:

form a docking connection between the first wireless dockee and the wireless docking host, wherein the first wireless dockee and the wireless docking host are part of a peer-to-peer (P2P) group and the first wireless dockee assumes a role of a group owner of the P2P group such that the wireless docking host is not directly discoverable by the second wireless dockee;

receive docking host information regarding the wireless docking host from the wireless docking host, the wireless docking host being configured to provide communication connectivity for the first wireless dockee and the second wireless dockee to at least one peripheral managed by the wireless docking host, and the docking host information identifying the at least one peripheral managed by the wireless docking host;

compile the docking host information regarding the wireless docking host; and advertise the docking host information regarding the wireless docking host.

20. The computer-readable storage medium of claim 19, wherein the P2P group is a Wi-Fi peer-to-peer (P2P) group and the first wireless dockee assumes a role of a Wi-Fi P2P group owner.

21. The computer-readable storage medium of claim 19, wherein the docking host information is hidden before the advertising of the docking host information by the first wireless dockee.

22. The computer-readable storage medium of claim 19, wherein the docking host information comprises at least one of:

an identifier at a docking protocol layer of every docking host that is a Wi-Fi peer-to-peer (P2P) client of the first wireless dockee;

capability information of every docking host that is a Wi-Fi P2P client of the first wireless dockee; or a Wi-Fi P2P Device identifier (ID) at a Wi-Fi P2P layer of every docking host that is a Wi-Fi P2P client of the first wireless dockee.

23. The computer-readable storage medium of claim 22, wherein the capability information of every docking host that is the Wi-Fi P2P client of the first wireless dockee comprises at least one of:

peripheral functions supported by a docking host;

docking use cases that may be supported by the docking host;

whether the docking host may be used by more than one dockee; or sharable peripheral functions that are currently available at the docking host.

24. A non-transitory computer-readable storage medium operational for using shared information about a wireless docking host, to which a first wireless dockee is docked, by a second wireless dockee, the computer-readable storage medium comprising instructions for causing a computer to:

receive docking host information regarding the wireless docking host by the second wireless dockee as advertised by the first wireless dockee, wherein the first wireless dockee and the wireless docking host are part of a peer-to-peer (P2P) group and the first wireless dockee assumes a role of a group owner of the P2P group such that the wireless docking host is not directly discoverable by the second wireless dockee, the wireless docking host being configured to provide communication connectivity for the first wireless dockee and the second wireless dockee to at least one peripheral managed by the wireless docking host, and the docking host information identifying the at least one peripheral managed by the wireless docking host;

initiate a device discoverability request transaction with the first wireless dockee based on the docking host information; and connect to the at least one peripheral managed by the wireless docking host as a result of the initiation of the device discoverability request transaction.

25. The computer-readable storage medium of claim 24, further comprising instructions for causing a computer to determine whether to connect to the wireless docking host before initiating the device discoverability request transaction.

26. The computer-readable storage medium of claim 25, wherein the instructions for causing a computer to initiate the device discoverability request transaction are further configured to request the first wireless dockee to make the wireless docking host available using a Wi-Fi peer-to-peer (P2P) device discoverability request transaction.

27. The computer-readable storage medium of claim 24, wherein the instructions for causing a computer to connect to the wireless docking host are further configured to connect to the wireless docking host using the docking host information.

28. A first wireless dockee configured for sharing information about a wireless docking host, to which the first wireless dockee is configured to be docked, with a second wireless dockee, the first wireless dockee comprising:

means for forming a docking connection between the first wireless dockee and the wireless docking host, wherein the first wireless dockee and the wireless docking host are part of a peer-to-peer (P2P) group and the first wireless dockee assumes a role of a group owner of the P2P group such that the wireless docking host is not directly discoverable by the second wireless dockee;

means for receiving docking host information regarding the wireless docking host from the wireless docking host, the wireless docking host being configured to provide communication connectivity for the first wireless dockee and the second wireless dockee to at least one peripheral managed by the wireless docking host, and the docking host information identifying the at least one peripheral managed by the wireless docking host;

means for compiling the docking host information regarding the wireless docking host; and means for advertising the docking host information regarding the wireless docking host.

29. The first wireless dockee of claim 28, wherein the P2P group is a Wi-Fi peer-to-peer (P2P) group and the first wireless dockee assumes a role of a Wi-Fi P2P group owner.

30. The first wireless dockee of claim 28, wherein the docking host information is hidden before the advertising of the docking host information by the first wireless dockee.

31. The first wireless dockee of claim 28, wherein the docking host information comprises at least one of:

an identifier at a docking protocol layer of every docking host that is a Wi-Fi peer-to-peer (P2P) client of the first wireless dockee;

capability information of every docking host that is a Wi-Fi P2P client of the first wireless dockee; or a Wi-Fi P2P Device identifier (ID) at a Wi-Fi P2P layer of every docking host that is a Wi-Fi P2P client of the first wireless dockee.

32. The first wireless dockee of claim 31, wherein the capability information of every docking host that is the Wi-Fi P2P client of the first wireless dockee comprises at least one of:

peripheral functions supported by a docking host;

docking use cases that may be supported by the docking host;

whether the docking host may be used by more than one dockee; or sharable peripheral functions that are currently available at the docking host.

33. A first wireless dockee configured for using shared information about a wireless docking host, to which a second wireless dockee is configured to be docked, from the second wireless dockee, the first wireless dockee comprising:

means for receiving docking host information regarding the wireless docking host by the first wireless dockee as advertised by the second wireless dockee, wherein the first wireless dockee and the wireless docking host are part of a peer-to-peer (P2P) group and the first wireless dockee assumes a role of a group owner of the P2P group such that the wireless docking host is not directly discoverable by the second wireless dockee, the wireless docking host being configured to provide communication connectivity for the first wireless dockee and the second wireless dockee to at least one peripheral managed by the wireless docking host, and the docking host information identifying the at least one peripheral managed by the wireless docking host;

means for initiating a device discoverability request transaction with the second wireless dockee based on the docking host information; and means for connecting to the at least one peripheral managed by the wireless docking host as a result of the initiation of the device discoverability request transaction.

34. The first wireless dockee of claim 33, further comprising means for determining whether to connect to the wireless docking host before initiating the device discoverability request transaction.

35. The first wireless dockee of claim 34, wherein the means for initiating the device discoverability request transaction are further configured to request the second wireless dockee make the wireless docking host available using a Wi-Fi peer-to-peer (P2P) device discoverability request transaction.

36. The first wireless dockee of claim 33, wherein the means for connecting to the wireless docking host are further configured to connect to the wireless docking host using the docking host information.

* * * * *